UNITED STATES PATENT OFFICE.

JOHN D. WARREN, OF LYNDONVILLE, NEW YORK.

VEGETABLE SOUP COMPOUND.

SPECIFICATION forming part of Letters Patent No. 236,284, dated January 4, 1881.

Application filed March 23, 1880. (Specimens.)

*To all whom it may concern:*

Be it known that I, JOHN D. WARREN, of Lyndonville, Orleans county, and State of New York, have made certain Improvements in a Vegetable Soup Compound as a permanent article of food and commerce, of which the following is a specification.

This invention relates more particularly to combining with vegetables certain antiseptics and preservatives, so that the vegetables, when properly dried, prepared, and so combined, can be kept sweet under all circumstances for use in making soups, as hereinafter fully explained.

The art of preserving vegetables and other food products together is a practice which has long existed; but the various substances thus preserved are often subject to such reactions from various subtle causes as to become moldy, wormy, &c., and the delicate and natural flavor which they originally possessed is lost or impaired by deleterious organic and other changes. Therefore, previous to my invention, no process that I am acquainted with has been perfectly adapted to the preservation of vegetables for the purpose of making a soup, and preventing molding, worminess, and also preventing those delicate reactions between the several compounds. My invention does all this, and also preserves the delicious flavor and odor so essential to making a good palatable soup.

It is well known that evaporated vegetables have been put up in various forms for army, navy, and other purposes; but, owing to the various conditions of temperature and humidity, these vegetables absorb moisture, become moldy, oftentimes wormy; also, by these agencies, often decay in a measure, and have an offensive odor, imparting it to the materials cooked with them. There is no doubt of the utility of such compounds for soup if they will keep sweet, and that in a soup properly prepared there shall be no preponderance of any one flavor and no disagreeable taste developed after long standing. When used for army purposes or for the navy and merchant services upon long voyages, they are eminently antiscorbutic and conduce greatly to the healthfulness of the consumer.

As the appearance of an article has much to do with its general use and consumption, my process includes, in the first place, the washing and paring of the various vegetables; then in passing them through machines especially constructed for the purpose, which cut them up into little squares. These are then spread upon sieves and put into an evaporator or hot-air chamber, and exposed to the bleaching action of sulphur, (for which I claim no originality,) and then exposed to varying temperature and for different lengths of time, until thoroughly evaporated. Some of the vegetables, being friable, will break up into irregular pieces—as, for instance, cabbage, celery, and onions; but the majority will retain their square shape or only slightly wither from molecular contraction. Now these latter, when immersed in water for a sufficient length of time, will nearly recover their natural size, consistence, taste, and color, and in this shape will have a natural appearance in the soup, which is most pleasing and better than could be obtained in any other way.

I am aware that mixtures of vegetables have been put up cut into shreds or irregular forms; but none have been put up, for the purpose of making a soup, cut in the form of small squares or cubes.

In order to explain more fully my process, I give the method of massing the vegetables which have been evaporated and cut, as hereinbefore described, to wit: I take, for example, four pounds of the evaporated and cut potatoes, one pound of the evaporated and cut turnips, one pound of the evaporated and cut carrots, eight ounces of the evaporated and cut parsnips, four ounces of the evaporated and cut onions, one ounce of the evaporated and cut celery, four ounces of the evaporated and cut cabbage—these all to be thoroughly mixed and then divided into fourteen separate and equal parts. Now have fourteen permanent receptacles of convenient size, (lined pasteboard or thin wooden boxes will do,) and in each one place the vegetables as last divided. Now, for the purpose of preventing and arresting that obscure organic reaction whereby evaporated vegetables have commonly become moldy, and thereby disagreeable in taste, and hence discarded from general use as an article of diet, as well as to prevent the attacks of insects when exposed to their invasion, I mix with each of those several parts of the whole (subdivided and placed in their receptacles before directed) a flavoring and antiseptic mixture composed of salicylic acid, sulphite of soda, ground celery-seeds, ground parsley, and the dust or flour of the vegetables hereinbefore named in about the following proportions, viz: salicylic acid, twenty grains; sulphite of soda, fifteen grains; ground celery-seed, thirty grains; ground parsley, twenty grains; ground red pepper, ten grains; and vegetable flour, thirty grains. This must be thoroughly mixed in order that the antiseptic portion shall be thoroughly subdivided by and with the flavoring portion, and the whole antiseptic and flavoring compound so mixed must be mixed and brought in complete contact with all the particles of the vegetables in the receptacles, as above directed.

In this process the cutting into small squares, the massing of the vegetables cut in this manner, their subdivision, and the addition to and mixing with each part of the mass so subdivided of the antiseptic and flavoring mixture are essential parts; but I do not intend to limit my invention to the exact proportions of the formula given above.

The proper preparation of the vegetables is important; but dried and evaporated vegetables and fruits are well known; but to put them up and preserve and keep sweet after a long period, so that when desired for use they shall be free from mold, worms, or any damaging agent whatever, is the main object of my invention. The addition of salicylic acid prevents any putrid or fermentative action, also hindering various reactions in organic products, and the sulphite of soda aids in arresting decomposition and destroying low forms of organic life.

I am aware that salicylic acid and sulphite of soda have been long known and used as preservatives, and I lay no broad claim to them as such. My invention possesses properties and advantages peculiar to itself, as will be readily adduced from the foregoing specification.

What I claim is—

A dry compound for use as vegetable soup, consisting of vegetables commonly used in such soup, such as potatoes, corn, cabbage, celery, carrots, &c., cut into small squares and thoroughly evaporated, combined with salicylic acid and sulphite of soda, to preserve the same, and ground celery-seed, ground parsley, and vegetable flour for flavoring the compound, all substantially as herein set forth.

In witness whereof I have hereunto signed my name in the presence of two subscribing witnesses.

JOHN D. WARREN.

Witnesses:
J. R. DRAKE,
T. H. PARSONS.